(12) United States Patent
Gehrke

(10) Patent No.: US 6,584,381 B2
(45) Date of Patent: Jun. 24, 2003

(54) DEVICE FOR EXCHANGING DATA WITH A MOTOR VEHICLE

(75) Inventor: Helmar-Steffen Gehrke, Eberdingen/Hochdorf (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/821,495

(22) Filed: Mar. 29, 2001

(65) Prior Publication Data

US 2001/0049569 A1 Dec. 6, 2001

(30) Foreign Application Priority Data

Mar. 29, 2000 (DE) .......................... 100 15 644

(51) Int. Cl.[7] ............................... G06F 7/00
(52) U.S. Cl. .......................................... 701/1
(58) Field of Search ...................... 701/1–2, 56, 23–25, 701/32–33, 36–37, 41, 45, 49, 53–54, 200–202; 307/10.1–10.8; 340/426, 825, 539–541, 5.4, 5.5, 5.41–5.42, 5.51–5.54, 5.6, 5.61, 5.64–5.67, 5.7, 5.74, 5.71–5.72, 5.8, 10.1, 5.81–5.85, 10.5–10.52, 825.7, 825.72, 988–995, 5.2, 5.3, 5.21–5.23; 235/380–382, 382.5, 384; 713/172–173, 182–186, 200–202

(56) References Cited

U.S. PATENT DOCUMENTS

| 5,544,061 | A | * | 8/1996 | Morimoto et al. .......... 701/202 |
| 5,838,251 | A | * | 11/1998 | Brinkmeyer et al. ....... 340/5.22 |
| 6,085,976 | A | * | 7/2000 | Sehr ........................... 235/384 |
| 6,198,996 | B1 | * | 3/2001 | Berstis ........................ 701/36 |
| 6,225,890 | B1 | * | 5/2001 | Murphy ...................... 340/426 |
| 6,323,566 | B1 | * | 11/2001 | Meier ........................ 307/10.2 |

FOREIGN PATENT DOCUMENTS

DE 196 48 042 5/1998

* cited by examiner

Primary Examiner—William A. Cuchlinski, Jr.
Assistant Examiner—Thu Nguyen
(74) Attorney, Agent, or Firm—Kenyon & Kenyon

(57) ABSTRACT

A device for exchanging data with a motor vehicle having a portable transponder, which is provided with a memory unit for storing authorization information, the transponder having an arrangement for exchanging data with a vehicle management system, via which the authorization information can be influenced by the vehicle management system, the transponder having a further data-exchange arrangement for transmitting the authorization information to a control unit arranged in a vehicle to attain operation authorization and/or access authorization of the vehicle.

6 Claims, 4 Drawing Sheets

DEVICE FOR EXCHANGING DATA WITH A MOTOR VEHICLE

BACKGROUND INFORMATION

German Patent Application No. DE 196 48 042 describes a vehicle having a key, this key being used to identify the authorized user. Data, such as customer address, vehicle license number, mileage, etc., is stored in this key. In a workshop, the key is inserted into a reading device, which is linked to a computer, on whose screen a user interface is carried out to read out the key data. However, the display is only possible when a password is manually entered.

This system is only suitable in combination with an external device for reading out relevant vehicle data.

An object of the present invention is to expand the functional scope of the portable key.

SUMMARY OF THE INVENTION

The device for exchanging data with a motor vehicle in accordance with the present invention includes a portable transponder, which is provided with a memory unit for storing at least one piece of authorization information. The transponder includes means for exchanging data with a vehicle management system via which means the authorization information can be influenced. The transponder includes data-exchange means for transmitting the authorization information to a control unit arranged in a vehicle. Within the framework of a keyless access authorization system or driving (operating) authorization system, a portable transponder is already present. Based on the portable transponder, the user verifies his/her access authorization or operating authorization. The present invention provides that the authorization information can be influenced by a vehicle management system. The vehicle management system allocates a vehicle that is still available and, therefore, to be assigned to a specific transponder, the user receiving access and operating authorization to the vehicle via the transponder. The vehicle management system can be used for car rental businesses, for example.

In one advantageous further refinement, it is provided that additional information is transmitted from the vehicle management system to the transponder to set user-dependent functions in the vehicle. For this purpose, a suitable database, which assigns personal settings, such as seat position, mirror position, etc., to each user, can be provided in the vehicle management system. Thus, the vehicle management system grants a specific user access authorization and/or operating authorization. The corresponding additional user-dependent information is transmitted together with this information to the transponder. Within the framework of the access authorization procedure and/or the operating authorization procedure between the vehicle and the transponder, this additional information stored in the transponder is transmitted to the control unit arranged in the vehicle. Using the additional information, the associated adjusting drives (seat, mirror), for example, are moved into the desired position.

In one advantageous embodiment, destination information is provided as additional information to be transmitted from the vehicle management system to the transponder. The user can input the desired destination in a user-friendly manner via the data acquisition of the vehicle management system. Together with the transmission of the operating authorization information and/or the access authorization information, the destination information also reaches the transponder. The transponder transmits the destination information to the control unit, which is arranged in the vehicle and which relays the destination information to a navigational system, which is linked via a bus system. Thus, the user can dispense with inputting the destination in the vehicle. This results in increased convenience for the user. This also contributes to an increase in safety, since the dangerous practice of inputting the destination during the trip can be dispensed with.

In one advantageous further refinement, it is provided that the vehicle management system relays certain resource information to the transponder. The term resource information denotes such information that results in the use of the vehicle being restricted. In this context, this can be a restriction of the power, of the top speed, of the allowed driving time and/or route, or of certain luxury functions (navigational system, car phone, etc.), for example. The control unit arranged in the vehicle also receives the resource information. The control unit relays this resource information to the corresponding function module in the motor vehicle. The resource information ensures a control within the framework of the received resources. If the usage-dependent resources (maximum allowable driving time or route) exceed a specifiable limiting value, appropriate measures, such as activating a display function and/or warning function or gradually stopping the operation of the motor vehicle, are introduced. Resource information can also include information controlling luxury functions. According to the level of equipment desired by the user, certain luxury functions are enabled or suppressed.

In one advantageous embodiment, the transponder receives, from the control unit arranged in the vehicle, a usage quantity, which is relayed to the vehicle management system. The current mileage, for example, could be used as the usage quantity. From this, the number of kilometers driven by a particular user could be calculated. Based on the mileage, the vehicle management system can automatically determine an inspection date of the corresponding vehicle, for example. As such, the information describing the vehicle is continually updated in the vehicle management system. The fuel tank contents could also be used as a usage quantity. In the vehicle management system, it can be immediately checked whether the user refilled the vehicle's fuel tank, and what fuel consumption is to be assigned to the vehicle. This information is used for optimizing the fleet of vehicles or the targeted selection of a suitable vehicle.

DETAILED DESCRIPTION

Figure 1:
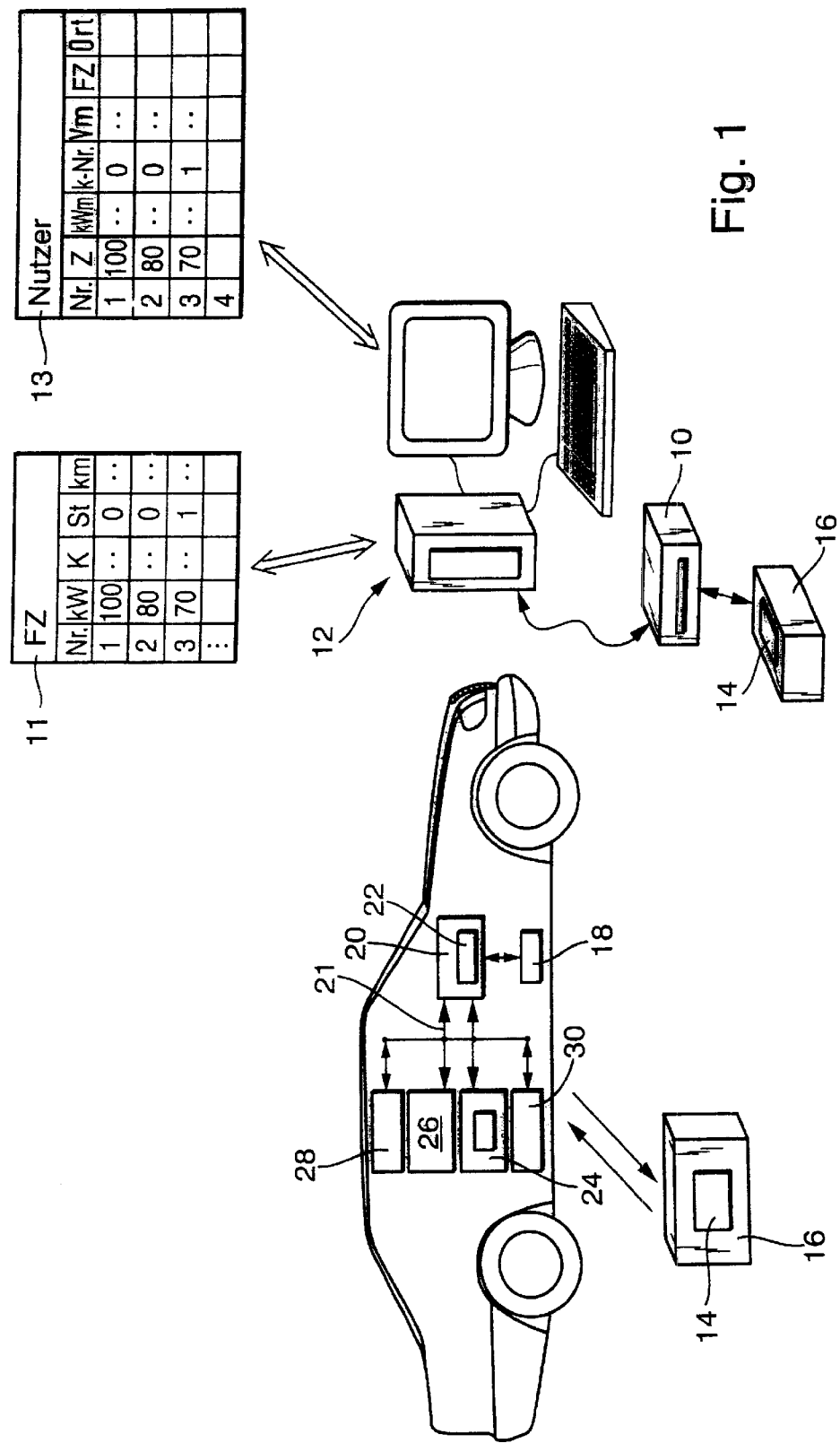
FIG. 1 shows a block diagram of the device according to the present invention.

A vehicle management system 12 includes a recording/reading device 10, a screen, and a keyboard. Vehicle management system 12 exchanges data with a vehicle database 11 and a user database 13. Certain, vehicle-dependent characteristic quantities, such as the power KW allocated to the vehicle, license number K, status ST, mileage KM, and, as applicable, the accessories (air conditioning, navigational system, etc.) are stored in vehicle database 11. Status information ST has a plurality of conditions: available, in use by "user identification", maintenance, repair, etc.

Specific information is stored in user database 13 for each user. In this context, the information is additional information Z, i.e., maximum allowable power KWM, maximum allowable speed VM (resources), customer number (or employee number) KNR, the assigned vehicle, the desired destination, etc. A transponder 16 can be inserted into recording/reading device 10 for the purpose of exchanging data with vehicle management system 12. Arranged in transponder 16 is a transponder memory unit 14 in which operating authorization information and/or access authorization information (authorization information) is stored. The same transponder 16 exchanges data via a transmitter/receiver 18 with a control unit 20 arranged in a vehicle. Control unit 20 has a memory unit 22. Control unit 20 is linked via a vehicle bus system 21 to a component 26, which is necessary for operation, an adjusting drive 28, a navigational system 30, as well as to a performance quantity acquisition system 24.

To initialize vehicle management system 12, the corresponding data in vehicle database 11 and user database 13 must be made available. In vehicle database 11, corresponding information is assigned to each vehicle. In this context, the information can be the particular vehicle make, the corresponding license number, the power KW of the vehicle. Vehicle management system 12 changes status information ST. If a vehicle is assigned to a user, the status information ST associated with the vehicle is overwritten using "in use." Moreover, based on the received transponder data, vehicle management system 12 updates the current mileage KM of the corresponding vehicle. To initialize vehicle management system 12, it is necessary to input a user profile. This database could already be previously stored if a known group of people (e.g. company employees) can access a vehicle pool. In addition to the person's name and address, the corresponding employee number, department, accounting department, etc. could be entered. Furthermore, additional information Z is stored for each user. In this context, the information pertains to user-specific settings of certain vehicle functions, such as the setting for the seat position or the mirror position. The current settings (additional information Z) can additionally be stored again from the vehicle in the vehicle management system 12. Moreover, certain resources KWM, VM can be assigned to the respective user. For example, a first user may only operate a vehicle having a certain specifiable maximum allowable power KWM, and another user is only authorized for a maximum allowable top speed VM. Additional resources, such as the maximum number of kilometers to be driven or the driving time, could also be stored.

Figure 2:
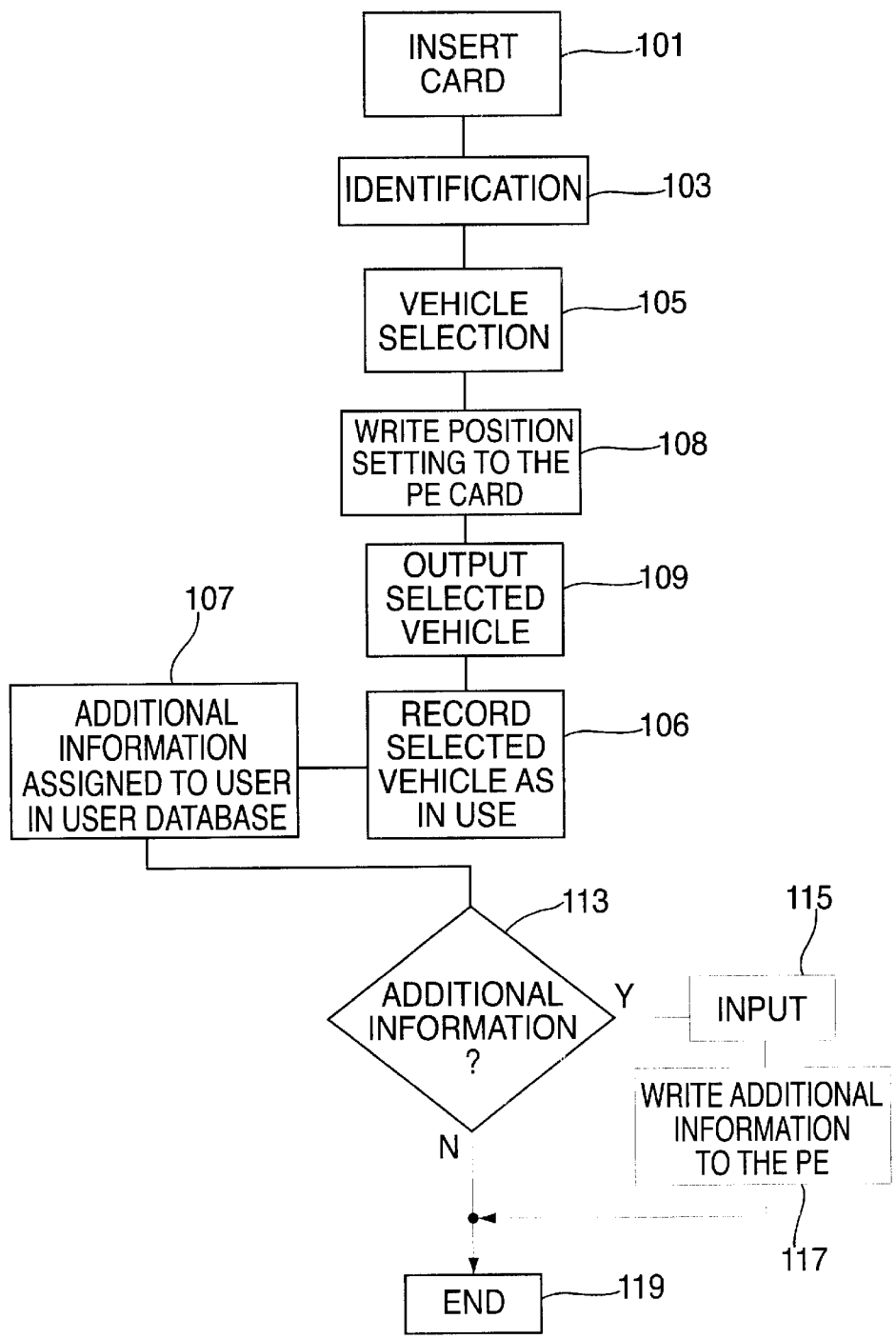
FIG. 2 shows a first flow chart in an exemplary embodiment of the present invention.
Figure 3:
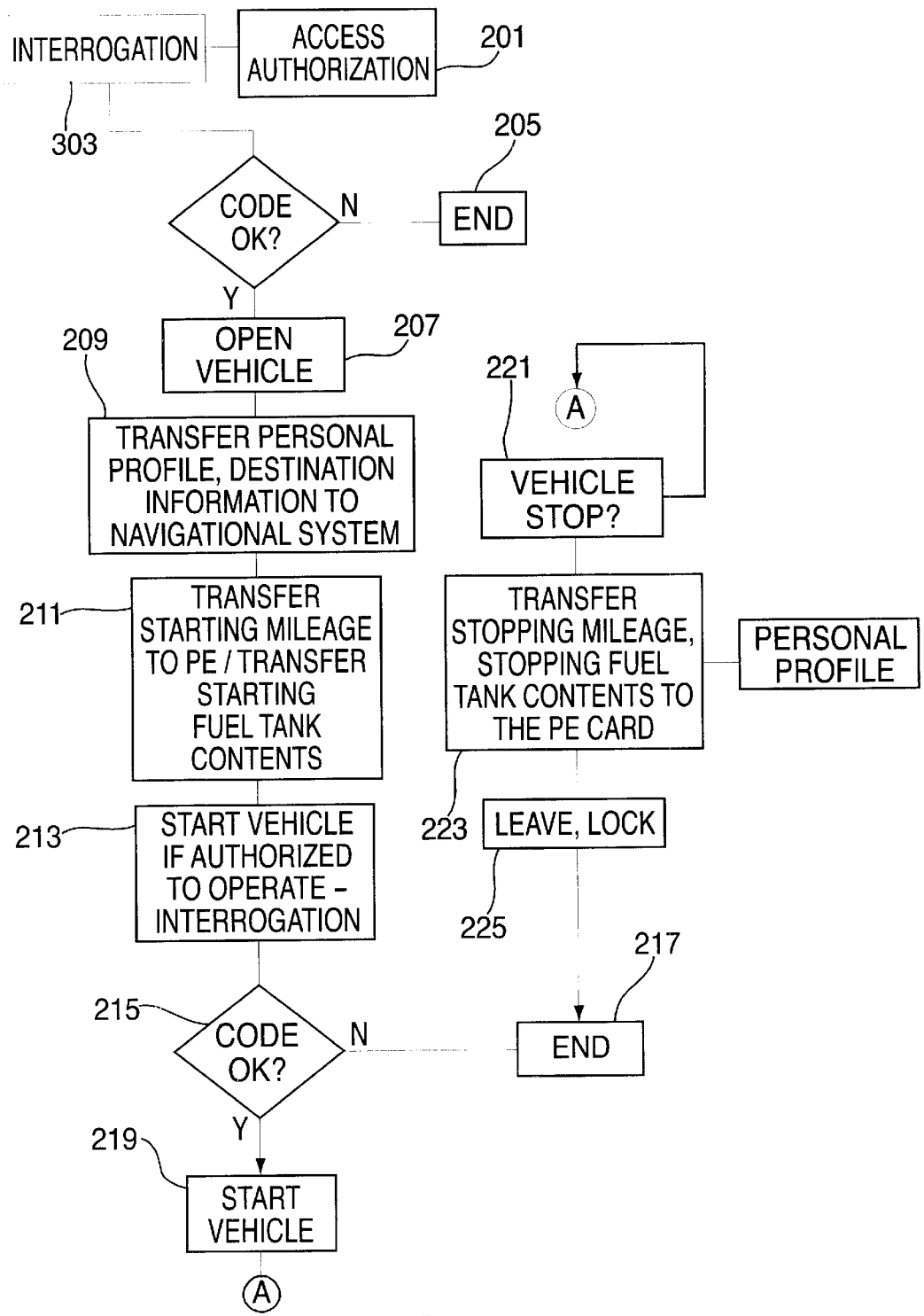
FIG. 3 shows a second flow chart in an exemplary embodiment of the present invention.
Figure 4:
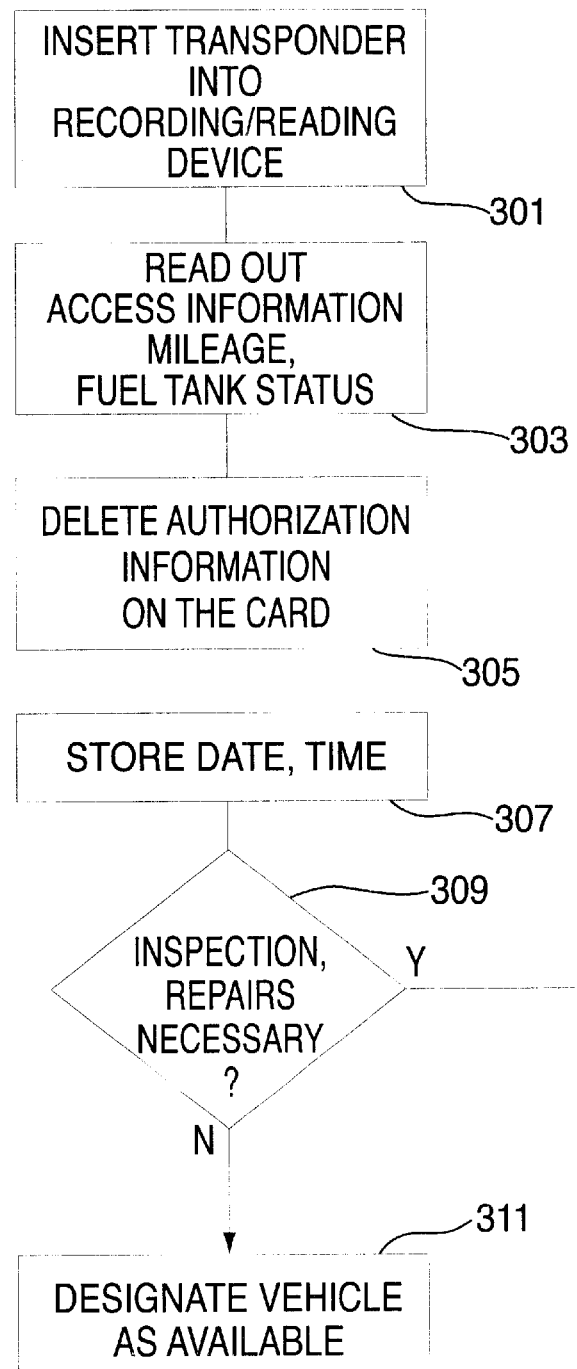
FIG. 4 shows a third flow chart in an exemplary embodiment of the present invention.

The operation of the device shown in FIG. 1 is explained based on the flow charts according to FIGS. 2, 3 and 4. In the sequence according to FIG. 2, a user who is registered in user database 13 would like to rent or borrow a vehicle. For this purpose, the user inserts a blank transponder 16 into recording/reading device 10 (step 101) and identifies himself/herself using the keyboard of vehicle management system 12 (step 103). In response, vehicle management system 12 selects, based on status information ST, a still available vehicle. If only certain resources, e.g. restricted power KWM, are available to the user, vehicle management system 12 determines, from the still available vehicles, a vehicle whose power KW does not exceed the maximum allowable power KWM (step 105). In step 106, vehicle management system 12 internally enters the assigned vehicle as in use, so that the corresponding status information ST changes. The used vehicle is also assigned to a user. Corresponding information identifying the user or the vehicle is also stored on transponder 16. Subsequently, vehicle management system 12 writes authorization information to transponder 16 via recording/reading device 10. The operating authorization information and/or access authorization information is stored in transponder memory unit 14. Alternatively, it can be provided that vehicle management system 12 activates authorization information already in memory unit 14 or releases it to be read out. Furthermore, in step 107, the additional information Z assigned to the corresponding user in the user database 13, and, as necessary, the maximum allowable speed VM are transmitted to transponder 16 and stored in transponder memory unit 14. In step 109, the user is shown the vehicle selected by vehicle management system 12.

In step 113, the user is given the choice of entering (further) additional information Z. In this context, the user can, for example, input his/her destination using the keyboard in step 115. Via recording/reading device 10, this information also reaches transponder 16 or its memory unit 14 in step 117. This completes the borrowing/renting process. The user removes transponder 16 from recording/reading device 10.

The user proceeds to the vehicle together with transponder 16. Included in memory unit 22 of control unit 20, which is arranged in the vehicle, is a (vehicle-specific) authorization code, which, in the case of an authorized user, matches the one written to transponder 16 in step 107. According to FIG. 3, the user begins the access authorization procedure (step 201) by pulling the door handle, for example. As a result, control unit 20 causes transmitter/receiver 18 on the vehicle side to emit an inquiry signal. The in-range transponder 16 receives the inquiry signal and in reply, sends the (vehicle-dependent) authorization code as a response signal back to transmitter/receiver 18, the signal being encoded in some instances. Control unit 20 compares the incoming code to a code stored in memory unit 22 of control unit 20 (interrogation 203). If they agree, control unit 20 recognizes an authorized transponder user and activates a master-key system in terms of an unlocking in step 207. Together with the authorization code, the additional information stored in transponder memory unit 14 is also transmitted in step 209. In this context, the information is additional information Z, i.e., the maximum allowable speed information VM (resource) and the inputted destination. Control unit 20 recognizes the incoming information with respect to type. It relays allocation information Z to adjusting drive 28 of a seat or a mirror. Adjusting drive 28 automatically moves into the position indicated by additional information Z. Maximum allowable speed VM reaches component 26, which is necessary for operation and is an engine management device. This controls the engine so that maximum allowable speed VM is not exceeded. Furthermore, control unit 20 relays the destination to navigational system 30. As such, the process of manually or verbally entering the destination in the vehicle can be omitted (step 213).

Actuating the start switch initiates an additional communication between transmitter/receiver 13 and transponder 16 in step 213. This is used to determine the operating authorization and is associated with a new interrogation of the authorization code and with a subsequent comparison of the content off memory unit 22 (interrogation 215) Different authorization information can also be provided for the access authorization and the operating authorization.

Moreover, control unit 20 transmits via transmitter/receiver 18 the vehicle's current mileage, which is provided by performance quantity acquisition system 24, to transponder 16. Thus, the starting mileage is stored in transponder memory unit 14. The starting mileage must be identical to the one stored in vehicle management system 12. For monitoring purposes, a comparison could be carried out. If the authorization code transmitted by transponder 16 matches the one stored in the memory unit, the vehicle is started in step 219. For this purpose, component 26, which is necessary for operation, receives a required enable signal. In interrogation 221, it is checked in a cyclical manner whether the user deactivates the vehicle. If this is the case, step 223 follows. In response to Ft "ignition off," the current final mileage is transmitted to transponder is, as it was relayed by performance quantity acquisition system 24 to control unit 20 and by (via) transmitter/receiver 18. Additional information z could also be transmitted. This is Particularly advantageous when the user changes the settings for the mirror drive or seat drive and saves the changes as new additional information Z. Then this new additional information z is used to update the additional information Z stored in user database 13 via the intermediate memory unit in transponder 16. The user exits and locks the vehicle in step 225. This concludes the normal operating process.

If the user would like to return the vehicle, he/she inserts transponder 16 into recording/reading device 10 in step 301. The data stored in transponder memory unit 14 is read out and communicated to vehicle management system 12 in step 303. Furthermore, the performance quantities, such as the starting mileage and the final mileage, which are also stored in transponder memory unit 14, are transmitted to vehicle management system 12. For example, mileage KM can be used for determining the monetary amount to be charged to the user, or to check or activate a maintenance process (interrogation 309). It can also be provided that additional information Z of the current user is read out from transponder memory unit 16 and replaces the additional information Z stored in user database 13 if the user changed additional information Z in the vehicle and this updated additional information Z was transmitted to transponder 16 in step 223, for example. In a step 305, recording/reading device 10 deletes or deactivates the information currently stored in transponder memory unit 14. Subsequently, in step 307, vehicle management system 12 completes the information with respect to the date and time of the return.

Based on the transmitted vehicle identification code/user code, vehicle management system 12 changes status information ST to "available." Thus, the vehicle is identified as being available again.

Additional variations with respect to the device described in FIG. 1 are also possible. In particular, the data transmission between transponder 16 and vehicle management system 12 could also be carried out via radio, infrared, etc.

Preferably, the transmission channel ensuring communication between transponder 16 and the vehicle could be used in this instance. The fuel tank contents could also be transmitted from the vehicle to transponder 16 as usage information to be relayed to vehicle management system 12. There, it could be automatically checked whether the vehicle's fuel tank was refilled.

What is claimed is:

1. A device for exchanging data with a motor vehicle, comprising:

a control unit situated in the vehicle;

at least one vehicle information database;

at least one user information database;

a vehicle management system, the vehicle management system selecting an available vehicle based on the at least one vehicle information database and the at least one user information database; and a portable transponder including a memory unit for storing at least one piece of authorization information associated with the available vehicle, the transponder exchanging data with the vehicle management system, the vehicle management system influencing the authorization information, the transponder transmitting the authorization information to the control unit to obtain authorization for normal operation of the available vehicle;

wherein the control unit transmits a characteristic usage quantity of the vehicle to the transponder, and the transponder relays usage information determined in the vehicle to the vehicle management system.

2. The device according to claim 1, wherein at least one of the vehicle management system and the control unit transmits at least one piece of additional information to the transponder to set user-dependent functions.

3. The device according to claim 1, wherein the vehicle includes a navigational system situated in the vehicle, and wherein the vehicle management system transmits destination information, for inputting the destination for the navigational system, to the transponder to be relayed to the navigational system.

4. The device according to claim 1, wherein the vehicle management system transmits resources to the transponder to restrict a scope of use of the vehicle.

5. The device according to claim 1, wherein at least one of said at least one vehicle information database and said at least one user information database stores at least one of: additional information, resources, and a characteristic usage quantity.

6. The device according to claim 1, wherein the transponder exchanges data bidirectionally with the control unit and with the vehicle management system.

* * * * *